United States Patent
Kidder et al.

(10) Patent No.: US 11,359,815 B2
(45) Date of Patent: Jun. 14, 2022

(54) SLEEVE ASSEMBLIES AND METHODS OF FABRICATING SAME

(71) Applicant: General Electric Company, Schenectady, NY (US)

(72) Inventors: Kyle Lee Kidder, Grosse Pointe Park, MI (US); Zsolt Czirle, Budapest (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 128 days.

(21) Appl. No.: 16/814,360

(22) Filed: Mar. 10, 2020

(65) Prior Publication Data
US 2021/0285643 A1 Sep. 16, 2021

(51) Int. Cl.
| | |
|---|---|
| *F23R 3/60* | (2006.01) |
| *F02C 7/28* | (2006.01) |
| *F23R 3/00* | (2006.01) |
| *F23R 3/46* | (2006.01) |

(52) U.S. Cl.
CPC .......... *F23R 3/60* (2013.01); *F02C 7/28* (2013.01); *F23R 3/002* (2013.01); *F23R 3/46* (2013.01); *F05D 2240/55* (2013.01); *F23R 2900/00005* (2013.01); *F23R 2900/00012* (2013.01)

(58) Field of Classification Search
CPC ........ F01D 9/023; F02C 7/28; F05D 2240/55; F23R 3/002; F23R 3/007; F23R 3/08; F23R 3/42; F23R 3/46; F23R 3/60; F23R 2900/00005; F23R 2900/00012
See application file for complete search history.

(56) References Cited

U.S. PATENT DOCUMENTS

| | | | |
|---|---|---|---|
| 5,160,243 | A | 11/1992 | Herzner et al. |
| 6,467,272 | B1 | 10/2002 | Biondo et al. |
| 9,759,427 | B2 | 9/2017 | Kidder et al. |
| 2007/0259194 | A1 | 11/2007 | Freling et al. |
| 2010/0050649 | A1 | 3/2010 | Allen |
| 2010/0064693 | A1 | 3/2010 | Koenig et al. |
| 2014/0260316 | A1 | 9/2014 | Weaver et al. |

FOREIGN PATENT DOCUMENTS

WO 2018080474 A1 5/2018

OTHER PUBLICATIONS

Extended European Search Report for Patent Application EP 21158845.4 dated Jul. 21, 2021; 8 pp.

*Primary Examiner* — Scott J Walthour
(74) *Attorney, Agent, or Firm* — Armstrong Teasdale LLP (57) ABSTRACT

A sleeve assembly for a combustion system includes a first duct including a first circumferential surface and a second duct including a second circumferential surface. The first circumferential surface radially overlaps the second circumferential surface such that the first duct and the second duct collectively define a continuous combustion chamber therein. The continuous combustion chamber is configured to receive high temperature gases flowing therethrough. The sleeve assembly further includes a wear insert removably coupled to the first circumferential surface and extending radially therefrom to engage the second circumferential surface.

15 Claims, 6 Drawing Sheets

SLEEVE ASSEMBLIES AND METHODS OF FABRICATING SAME

BACKGROUND

The field of this disclosure relates generally to sleeve assemblies and, more particularly, to sleeve assemblies for use with a combustor.

At least some known turbine assemblies include a compressor, a combustor, and a turbine coupled together in a serial flow arrangement. Gas flowing into the compressor is compressed and discharged into the combustor where it is mixed with fuel. The resulting mixture is ignited to generate combustion gases that are channeled from the combustor through the turbine. The gases drive the turbine, which in turn, may power an electrical generator coupled to the turbine.

At least some known combustors include a sleeve assembly that includes a liner and a transition duct that collectively define a combustion chamber in which the mixture of fuel and compressed gas is ignited prior to it being supplied to a turbine coupled to the transition duct. Known sleeve assemblies generally permit axial movement between the transition duct and liner relative to one another in order to accommodate for thermal expansion/movement during operation. As a result, at least some such assemblies may be prone to wear at the interface defined between the liner and the transition duct.

To reduce the effects of any movement within the sleeve assemblies, at least some known sleeve assemblies include an abrasion resistant wear coating applied to the transition duct and/or the liner. More specifically, at least some known wear coatings are applied in the form of a spray coating. However, applying these spray coatings generally requires a significant preparation of the surface receiving the coating before the spray coating is applied. Moreover, if maintenance is needed in either the liner or the transition duct, the coating must be manually removed before a new wear coating may be applied. Removing such a coating ay be a time-consuming and laborious task.

Accordingly, it would be desirable to provide a sleeve assembly that allows for simpler, more robust, and more easily replaceable wear insert.

BRIEF DESCRIPTION

In one aspect, a sleeve assembly for a combustion system is provided. The sleeve assembly includes a first duct including a first circumferential surface and a second duct including a second circumferential surface. The first circumferential surface radially overlaps the second circumferential surface such that the first duct and the second duct collectively define a continuous combustion chamber therein. The continuous combustion chamber is configured to receive high temperature gases flowing therethrough. The sleeve assembly further includes a wear insert removably coupled to the first circumferential surface and extending radially therefrom to engage the second circumferential surface.

In another aspect, a turbine assembly is provided. The turbine assembly includes a compressor section, a turbine section coupled downstream of the compressor section, and a combustor. The combustor includes a plurality of cans coupled in flow communication between the compressor section and the turbine section. A first can of the plurality of cans includes a sleeve assembly. The sleeve assembly includes a first duct including a first circumferential surface and a second duct including a second circumferential surface. The first circumferential surface radially overlaps the second circumferential surface such that the first duct and the second duct collectively define a continuous combustion chamber therein. The continuous combustion chamber is configured to receive high temperature gases flowing therethrough. The sleeve assembly further includes a wear insert removably coupled to the first circumferential surface and extending radially therefrom to engage the second circumferential surface.

In yet another aspect, a method of assembling a sleeve assembly for a combustion system is provided. The method includes providing a first duct including a first circumferential surface. The method also includes removably coupling a wear insert to the first circumferential surface. The method further includes positioning a second duct, including a second circumferential surface, adjacent the first duct such that the first circumferential surface radially over laps the second circumferential surface and the wear insert engages the second circumferential surface. The first duct and the second duct collectively define a continuous combustion chamber therein configured to receive high temperature gases flowing therethrough.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

The exemplary systems and methods described herein overcome at least some disadvantages of known sleeve assemblies by providing a wear insert that is removably coupled to at least a portion one duct of the sleeve assembly to facilitate reducing abrasion resistance at the sliding interface within the sleeve assembly. More specifically, the embodiments described herein include a first duct having a first circumferential surface, a second duct having a second circumferential surface, and a wear insert that extends circumferentially between the two duct surfaces. More specifically, the first circumferential surface radially overlaps the second circumferential surface such that first duct and the second duct collectively define a continuous combustion chamber therein. In one embodiment, the wear insert is removably coupled to the first circumferential surface and extends radially therefrom to engage the second circumferential surface. In some embodiments, the wear insert is a single-piece unitary structure. In some embodiments, the first duct includes a groove radially recessed from the first circumferential surface and the wear insert is seated within the groove.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
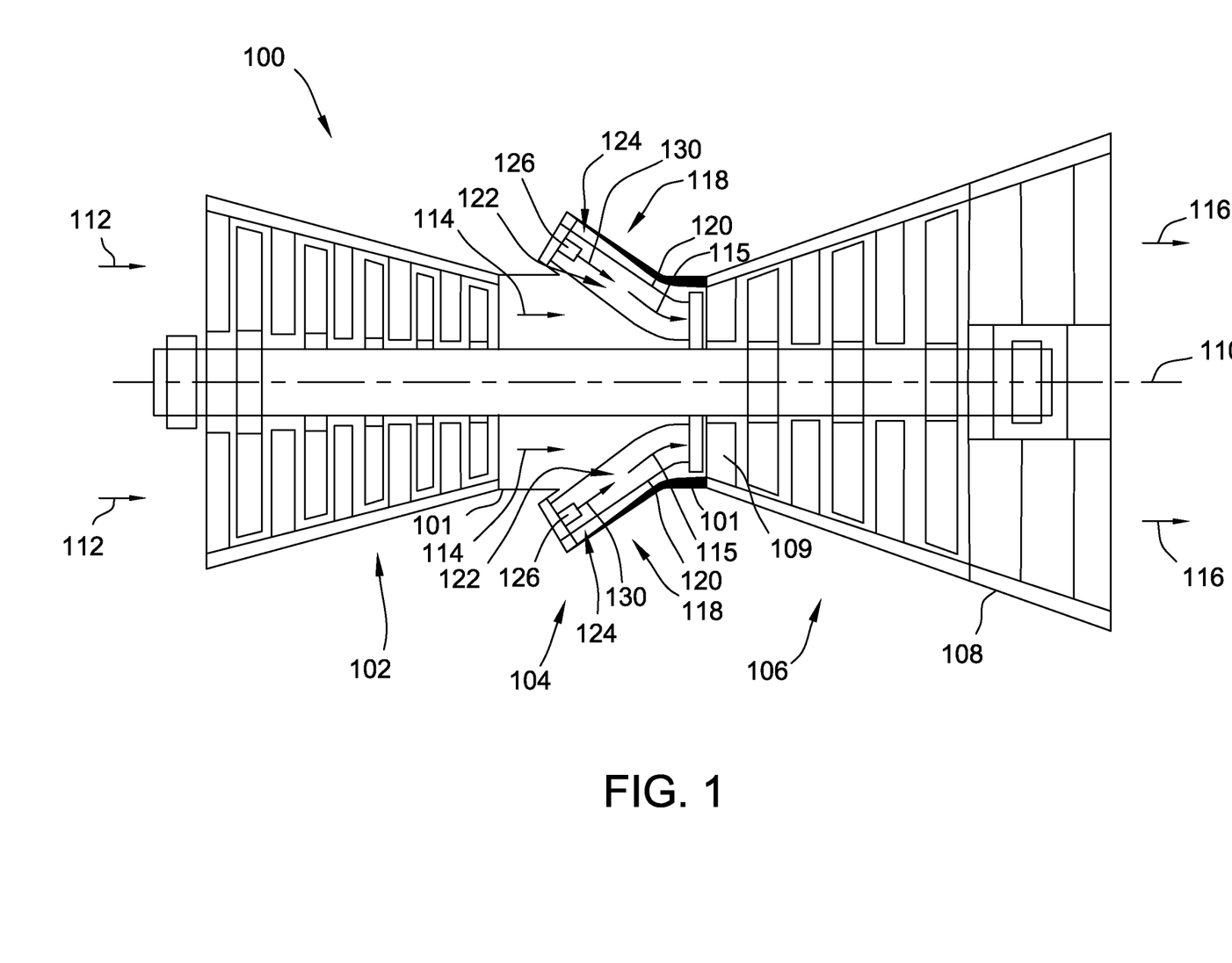
FIG. 1 is a schematic view of an exemplary turbine assembly.

FIG. 1 is a schematic view of an exemplary turbine assembly 100. In the exemplary embodiment, turbine assembly 100 is an industrial gas turbine assembly that includes a compressor section 102, a combustor section 104, and a turbine section 106 coupled in serial flow communication with one another within a casing 108 along a centerline axis 110. In operation, a working gas 112 flows into compressor section 102 where it is compressed prior to being channeled into combustor section 104. Compressed gas 114 is mixed with fuel (not shown) and ignited in combustor section 104 to generate combustion gases 115 that are channeled through turbine section 106 and prior to being discharged from turbine section 106 as exhaust 116.

In the exemplary embodiment, combustor section 104 includes a plurality of combustion cans 118. Each combustion can 118 has a sleeve assembly 120 that defines a combustion chamber 122. A fuel delivery system 124 is coupled to each combustion can 118 and includes a fuel injector 126 located at the forward end of combustion can 118. A mixture of fuel and compressed gas is injected into combustion chamber 122 in an axial direction via fuel injector 126.

Figure 2:
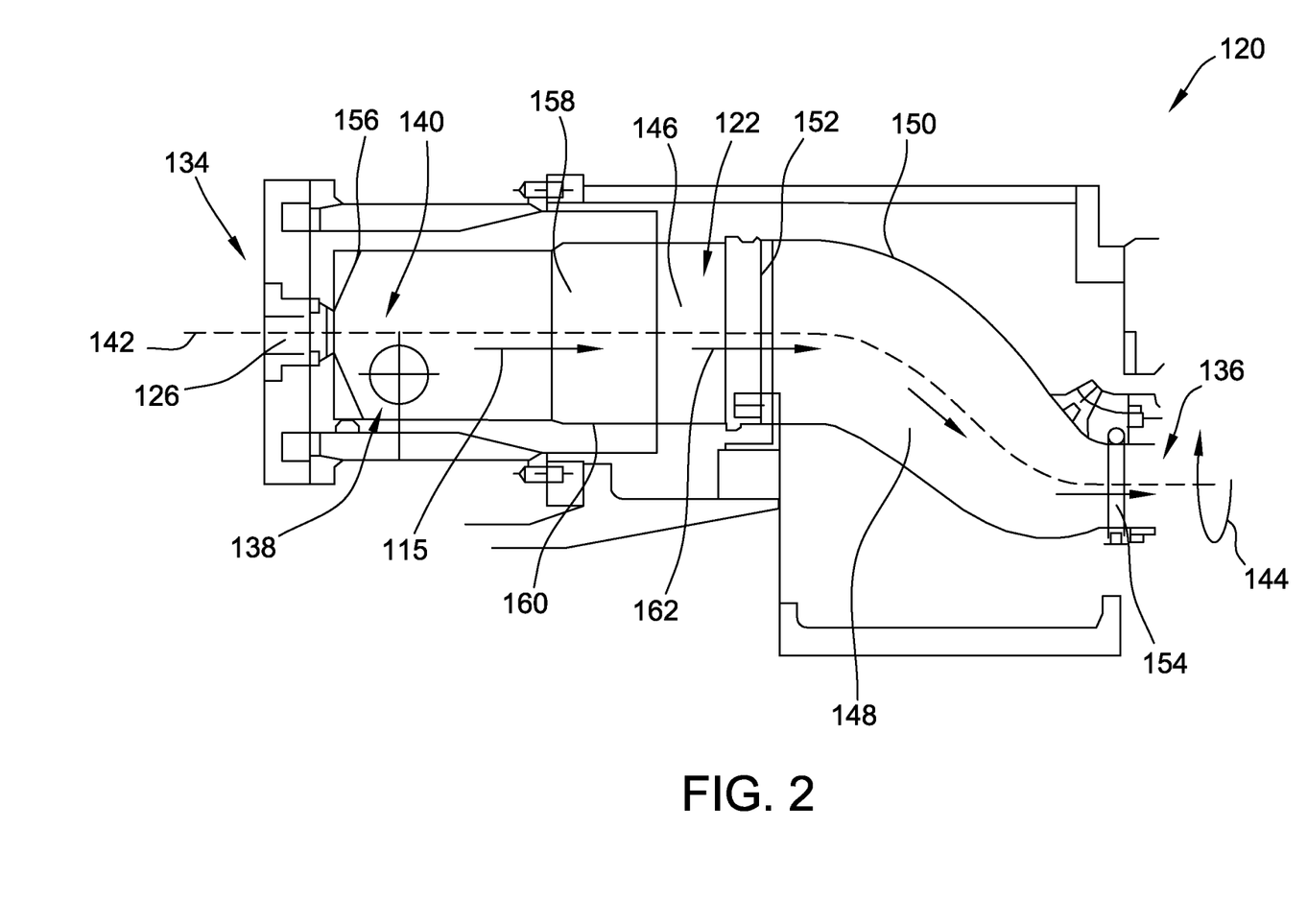
FIG. 2 is a schematic view of an exemplary sleeve assembly that may be used with the turbine assembly shown in FIG. 1.

FIG. 2 is a schematic view of an exemplary sleeve assembly 120 that may be used with turbine assembly 100. In the exemplary embodiment, sleeve assembly 120 has a forward end 134 that is coupled to a compressor discharge casing 101 (shown in FIG. 1), and an opposite aft end 136 that is coupled in flow communication with a nozzle 109 (shown in FIG. 1) of turbine section 106. Sleeve assembly 120 defines a combustion chamber 122 between forward and aft ends 134 and 136, respectively.

In the exemplary embodiment, a cross-fire tube 138 is coupled to sleeve assembly 120. Cross-fire tube 138 is coupled to sleeve assembly 120 such that tube 138 extends into a combustion zone 140 of combustion chamber 122. In alternative embodiments, cross-fire tube 138 may extend into any other zone defined within combustion chamber 122. In the exemplary embodiment, during operation of turbine assembly 100, a mixture of fuel and compressed gas is injected into combustion chamber 122 via a fuel injector 126. The mixture is ignited in combustion zone 140 of combustion chamber 122, thereby generating combustion gases 115 that flow through turbine section 106 (shown in FIG. 1).

In the exemplary embodiment, sleeve assembly 120 extends axially 142 and circumferentially 144 within combustion chamber 122. As used herein, the term "axial" (or any variation thereof) refers to a dimension extending along the center of any suitable shape (e.g., a square, a rectangle, a triangle, etc.) and is not limited to a dimension extending along the center of a circular shape. Similarly, as used herein, the term "radius" (or any variation thereof) refers to a dimension extending outwardly from a center of any suitable shape (e.g., a square, a rectangle, a triangle, etc.) and is not limited to a dimension extending outwardly from a center of a circular shape. Additionally, as used herein, the term "circumference" (or any variation thereof) refers to a dimension extending around a center of any suitable shape (e.g., a square, a rectangle, a triangle, etc.) and is not limited to a dimension extending around only a center of a circular shape.

In the exemplary embodiment, sleeve assembly 120 includes a transition duct 148 or, more broadly, a first duct, and a liner 146 or, more broadly, a second duct. In the exemplary embodiment, transition duct 148 is a single-piece, unitary structure and includes an outer surface 150 that extends from a forward end 152 adjacent liner 146, to an opposite aft end 154. In particular, in the exemplary embodiment, transition duct 148 is positioned to circumscribe at least a portion of liner 146. In alternative embodiments, liner 146 is positioned to circumscribe at least a portion of transition duct 148. In another alternative embodiment, transition duct 148 is fabricated using any other suitable processes, and may include any suitable number of pieces that enables sleeve assembly 120 to function as described herein (e.g., transition duct 148 may not be a single-piece, unitary structure). Transition duct 148 may be any suitable level of rigidity or flexibility.

In the exemplary embodiment, liner 146 is a single-piece, unitary structure having a forward end 156, adjacent fuel injector 126, and an aft end (not shown) that is sized to be received within transition duct 148. In the exemplary embodiment, liner 146 includes a body 158 having an outer surface 160 and a seal 162 that couples to outer surface 160 and extending axially therefrom into transition duct 148. In the exemplary embodiment, liner 146 is generally cylindrical. In alternative embodiments, liner 146 may be any other shape that enables liner 146 to function as described herein.

Figure 3:
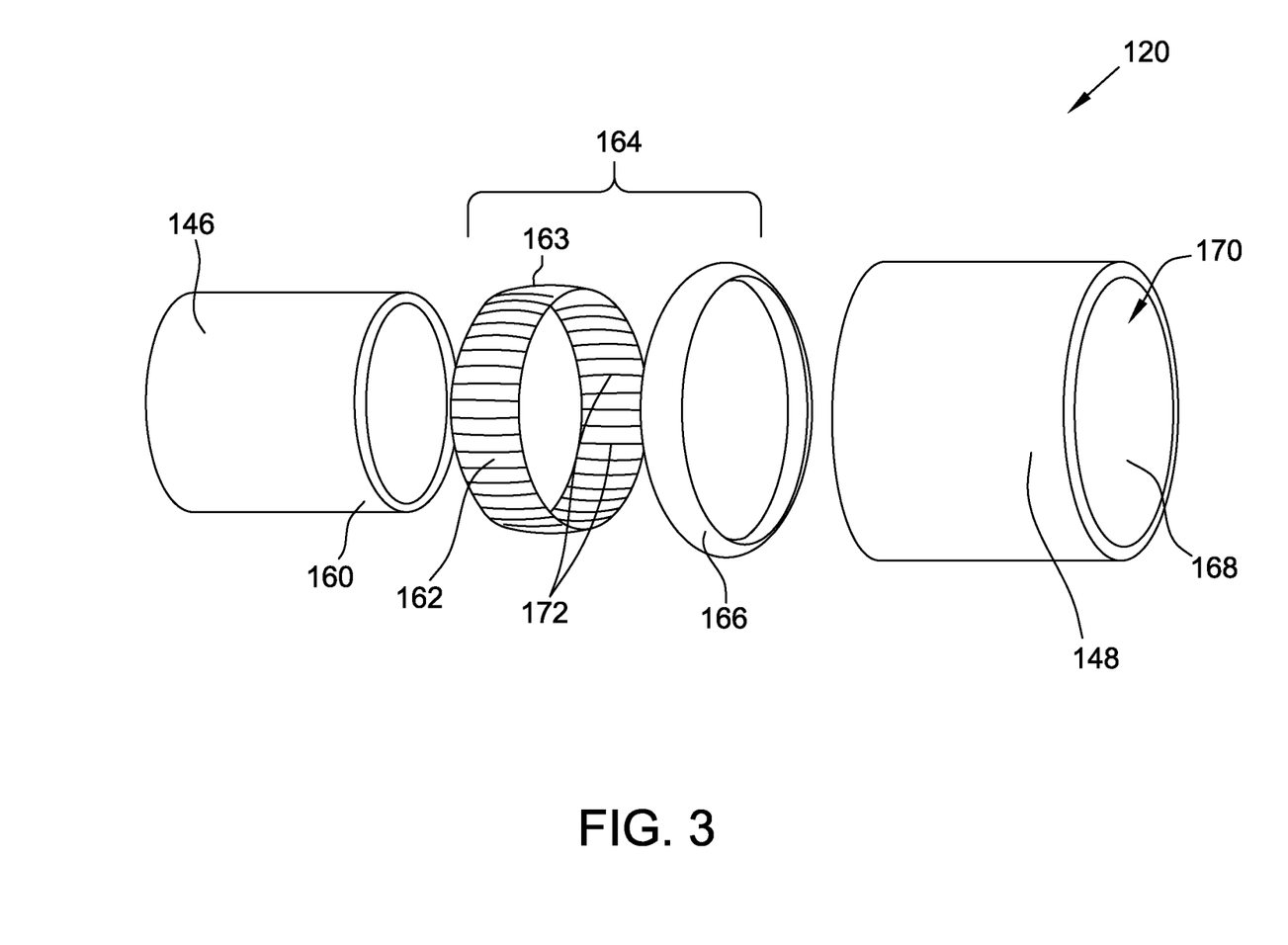
FIG. 3 is a schematic exploded view of a portion of the sleeve assembly shown in FIG. 2.
Figure 4:
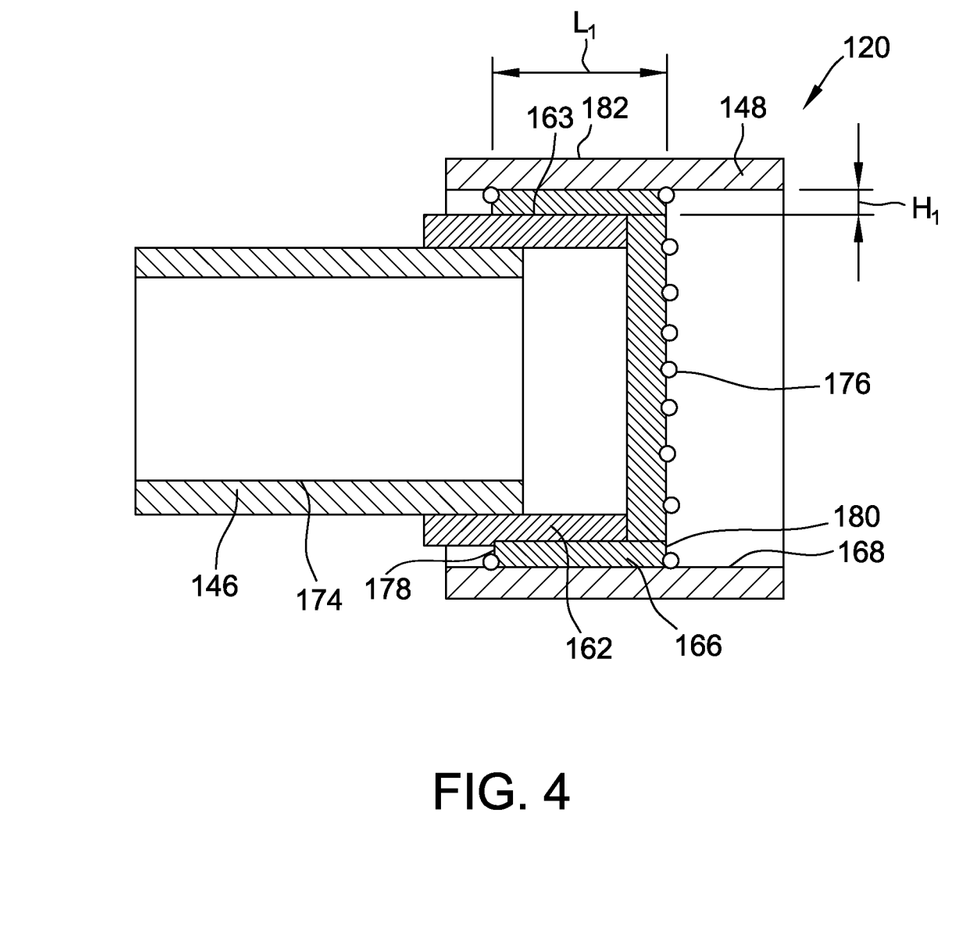
FIG. 4 is a schematic sectional view of the sleeve assembly shown in FIG. 3.

FIG. 3 is a schematic exploded view of a portion of sleeve assembly 120 shown in FIG. 2. FIG. 4 is a schematic sectional view of a portion of sleeve assembly 120 shown in FIG. 3. In the exemplary embodiment, transition duct 148 is coupled to liner 146 via an interface assembly 164. Interface assembly 164 includes a seal 162 and an insert 166 sized to be in direct contact with seal 162 when transition duct 148 is coupled to liner 146. More specifically, in the exemplary embodiment, seal 162 is fixably secured to outer surface 160 of liner 146 such that seal extends axially into transition duct 148. In alternative embodiments, seal 162 extends axially between liner 146 and transition duct 148 in any manner that enables sleeve assembly 120 to function as described herein. For example, and without limitation, in some alternative embodiments, seal 162 may be integrally formed with liner 146 or transition duct 148. In the exemplary embodiment, seal 162 slidably engages transition duct 148 to permit relative axial movement and/or expansion (e.g., due to thermal expansion during operation) of liner 146 and/or transition duct 148 relative to the other. In each embodiment, seal 162 facilitates coupling liner 146 to transition duct 148 in any manner that enables sleeve assembly 120 to function as described herein.

In the exemplary embodiment, transition duct 148 includes an inner surface 168 (or more broadly, a first circumferential surface) that defines an internal cavity 170 of transition duct 148 sized and oriented to receive combustion gases 115 (shown in FIG. 2) from liner 146. In alternative embodiments, sleeve assembly 120 includes one or more inner sleeves (not shown) used to channel combustion gases 115 (shown in FIG. 2) and that defines one or more cooling paths (not shown) extending between transition duct 148 and liner 146 (e.g., radially outward from the inner sleeve). For example, in some such embodiments, cooling flow (not shown) flows through the one or more cooling paths (not shown) to facilitate cooling inner surface 168 and combustion gases 115 (shown in FIG. 2) are not in contact with inner surface 168 of transition duct 148.

In the exemplary embodiment, seal 162 is sized with an axial length such that, when liner 146 is coupled to transition duct 148 (e.g., as shown in FIG. 4) seal 162 extends axially between liner 146 and transition duct 148 and radially overlaps at least a portion of inner surface 168 of transition duct 148. In alternative embodiments, seal 162 is fixably secured to transition duct 148 and extends axially to radially overlap a portion of outer surface 160 of liner 146. In the exemplary embodiment, seal 162 is a spring seal, or, more specifically, a hula seal. Seal 162 provides a substantially air-tight seal at the interface defined between liner 146 and transition duct 148. Seal 162 includes a plurality of axially extending slits 172 defined therein that are circumferentially spaced about seal 162. Slits 172 enable contraction and expansion of seal 162 such that, when transition duct 148 is coupled to liner 146, transition duct 148 engages and compresses seal 162, thereby squeezing or sealing slits 172 to provide the air-tight seal 162. More specifically, in the exemplary embodiment, insert 166 compresses seal 162 when liner 146 is coupled to transition duct 148. In the exemplary embodiment, seal 162 is a hula seal 162. In alternative embodiments, seal 162 is any other seal that enables sleeve assembly 120 to function as described herein.

Referring to FIG. 4, in the exemplary embodiment, insert 166 is fixably secured to inner surface 168 and extends radially therefrom to engage an outer surface 163 (or, more broadly, a second circumferential surface) of seal 162 to facilitate wear-protection to transition duct 148 and seal 162 during operation. As shown in FIG. 4, insert 166 is enlarged for purposes of clarity. In particular, in the exemplary embodiment, insert 166 extends a radial height $H_1$ from inner surface 168 of transition duct 148 that in the exemplary embodiment, is between about $1/1000^{th}$ to about $1/10^{th}$ of an inch. More specifically, in the exemplary embodiment, $H_1$ is approximately between about $10/1000^{th}$ and about $15/1000^{th}$ of an inch. In alternative embodiments, insert 166 height $H_1$ may be of any size that enables sleeve assembly 120 to function as described herein.

In the exemplary embodiment, insert 166 is a single-piece unitary structure that circumferentially extends about inner surface 168 of transition duct 148. Insert 166 extends an axial length $L_1$. Length $L_1$ is selected to be sufficient to shield inner surface 168 from (i.e., inhibit direct with) seal 162 such that, during operation, seal 162 directly contacts insert 166 and does not directly contact inner surface 168 of transition duct 148. In particular, during operation, sliding contact between seal 162 and inner surface 168 of transition duct 148 may occur as a result of expansion and/or movement of at least one of liner 146 or transition duct 148 relative to one another. Such sliding contact can result in wear (i.e., material degradation) of inner surface 168 over time. In the exemplary embodiment, seal 162 slidingly contacts insert 166 and does not slidingly contact inner surface 168 of transition duct 148. In other words, in the exemplary embodiment, insert 166 and not transition duct 148, incurs the wear resulting from the frictional contact between liner 146 and transition duct 148. In alternative embodiments, for example, as described above, where seal 162 is fixably coupled to transition duct 148, insert 166 couples to an inner surface 174 of liner 146 and extends radially between inner surface 174 and seal 162. In further alternative embodiments, insert 166 may be coupled to either one of liner 146 or transition duct 148 in any other manner that enables sleeve assembly 120 to function as described herein.

In the exemplary embodiment, insert 166 is fixably secured to inner surface 168 of transition duct 148 via a plurality of weld joints 176. More specifically, insert 166 is spot welded to inner surface 168 via weld joints 176 along a first radial edge 178 of insert 166 and along a second radial edge 180. In the exemplary embodiment, weld joints 176 are substantially evenly-spaced about the circumference of insert 166 along first radial edge 178 and along second radial edge 180. In alternative embodiments, insert 166 is fixably secured to inner surface 168 in any manner that enables sleeve assembly 120 to function as described herein. For example, and without limitation, in some alternative embodiments, transition duct 148 includes at least one aperture (not shown) defined therein that extends between inner surface 168 and an outer surface 182 of transition duct 148 (e.g., by drilling a hole radially through transition duct 148). In such embodiments, insert 166 is welded to transition duct 148 via the at least one aperture.

In the exemplary embodiments, weld joints 176 enable insert 166 from inner surface 168 to be easily removed as a single-piece unit (i.e., insert 166 may be removed and remain substantially intact as a single unit). For example, in contrast with known other sleeve assemblies that use a spray-on wear coating, in the exemplary embodiment, during a maintenance operation for example, to replace insert 166, an operator need only cut weld joints 176 to facilitate removing insert 166 from inner surface 168.

Figure 5:
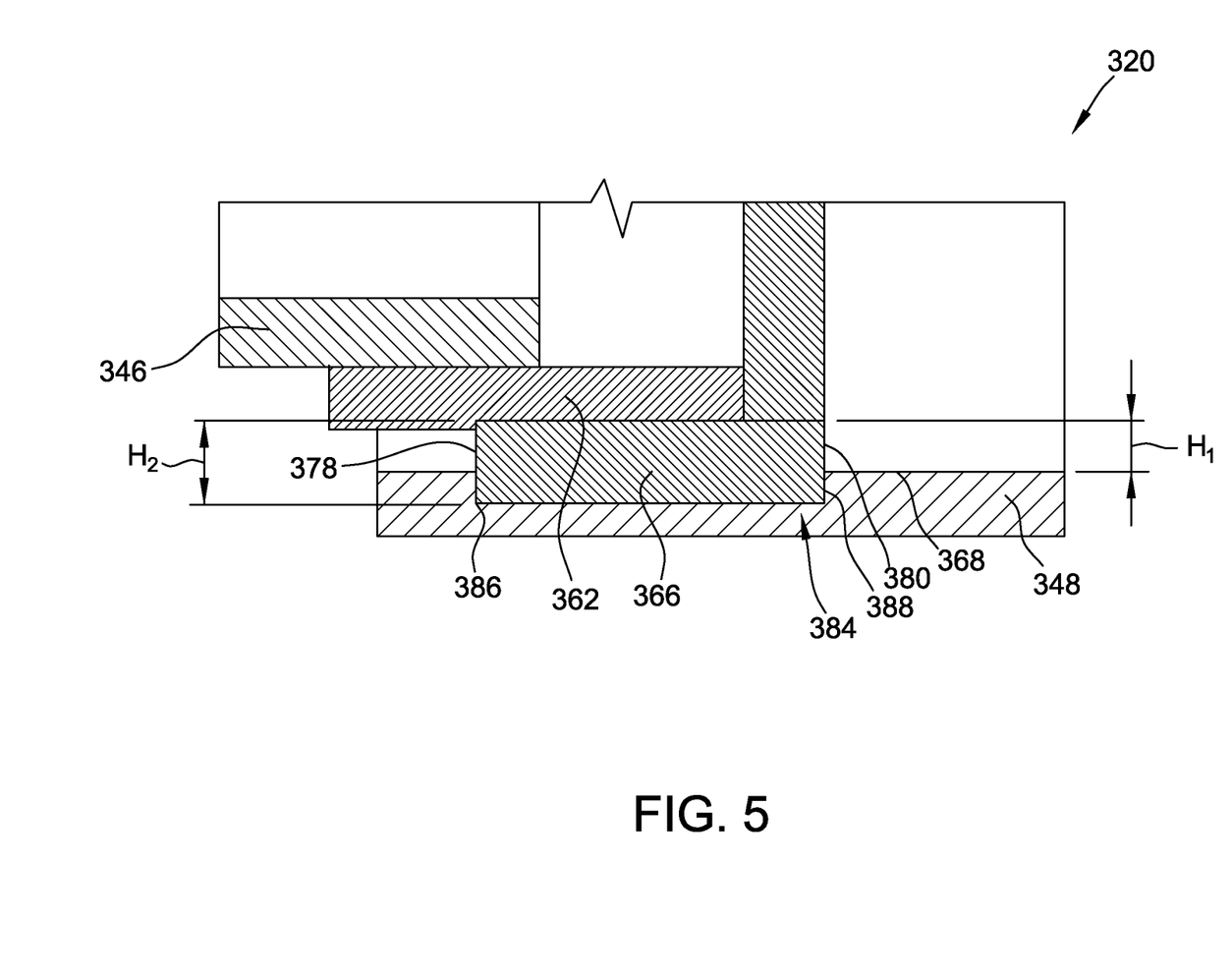
FIG. 5 is a sectional view of a portion of an alternative sleeve assembly that may be used with the exemplary turbine assembly of FIG. 1.

FIG. 5 is a sectional view of a portion of an alternative sleeve assembly 320 for use with turbine assembly 100 (shown in FIG. 1). In the exemplary embodiment, sleeve assembly 320 is substantially the same as sleeve assembly 120 as described above with respect to FIGS. 1-4, except as described below. More specifically in the exemplary embodiment, a transition duct 348 of sleeve assembly 120 defines a groove 384 radially recessed relative to an inner surface 368 of transition duct 348. More specifically, in the exemplary embodiment, groove 384 is recessed relative to inner surface 368 and positioned radially outward therefrom. In alternative embodiments, groove 384 is defined on seal 362 and/or liner 346 and is recessed radially inward.

In the exemplary embodiment, an insert 366 is received within groove 384. Insert 366 is substantially the same as insert 166 described above with respect to FIGS. 3 and 4, except as described below. More specifically, in the exemplary embodiment, insert 366 extends from groove 384 to approximately the same height $H_1$ radially inward of (i.e., above) inner surface 368 as insert 166 (shown in FIG. 4). In other words, in the exemplary embodiment, insert 366 extends a greater total radial height, indicated at $H_2$, which is greater than the total radial height $H_1$ of insert 166, to extend radially inward from inner surface 368. In the exemplary embodiment, groove 384 is sized such that, when insert 366 is seated within groove 384, insert 366 engages seal 362. In alternative embodiments, groove 384 and insert 366 are sized in any manner that enables sleeve assembly 320 to function as described herein.

In the exemplary embodiment, insert 366 is coupled to transition duct 348 via groove 384. More specifically, unlike sleeve assembly 120 described above with respect to FIGS. 1-4, in the exemplary embodiment, insert 366 is not welded to transition duct 348. Rather, in the exemplary embodiment, groove 384 includes a first radial sidewall 386 and a second radial sidewall 388. First radial sidewall 386 engages a first radial edge 378 of insert 366 and second radial sidewall 388 engages a second radial edge 380 of insert 366 such that, when insert 466 is received within groove 384, axial movement of insert 366 therein is inhibited. Moreover, in the exemplary embodiment, seal 362 applies a radially outward force on insert 366 when liner 346 is coupled to transition duct 348 such that seal 362 secures insert 366 within groove 384. As a result, in the exemplary embodiment, insert 366 is secured in place on transition duct 348 without fixable couplings (e.g., weld joints 176, shown in FIG. 4) and may be more easily removed and replaced such as, for example, during a maintenance operation. In alternative embodiments, insert 366 is coupled to transition duct 348 in any manner that enables sleeve assembly 320 to function as described herein. For example, and without limitation, in some alternative embodiments, insert 366 is welded to transition duct 348 after insert 366 is seated in groove 384. In further alternative embodiments, one of insert 366 and groove 384 includes an engagement feature (e.g., a latch and catch) to facilitate releasably coupling insert 366 to transition duct 348.

Figure 6:
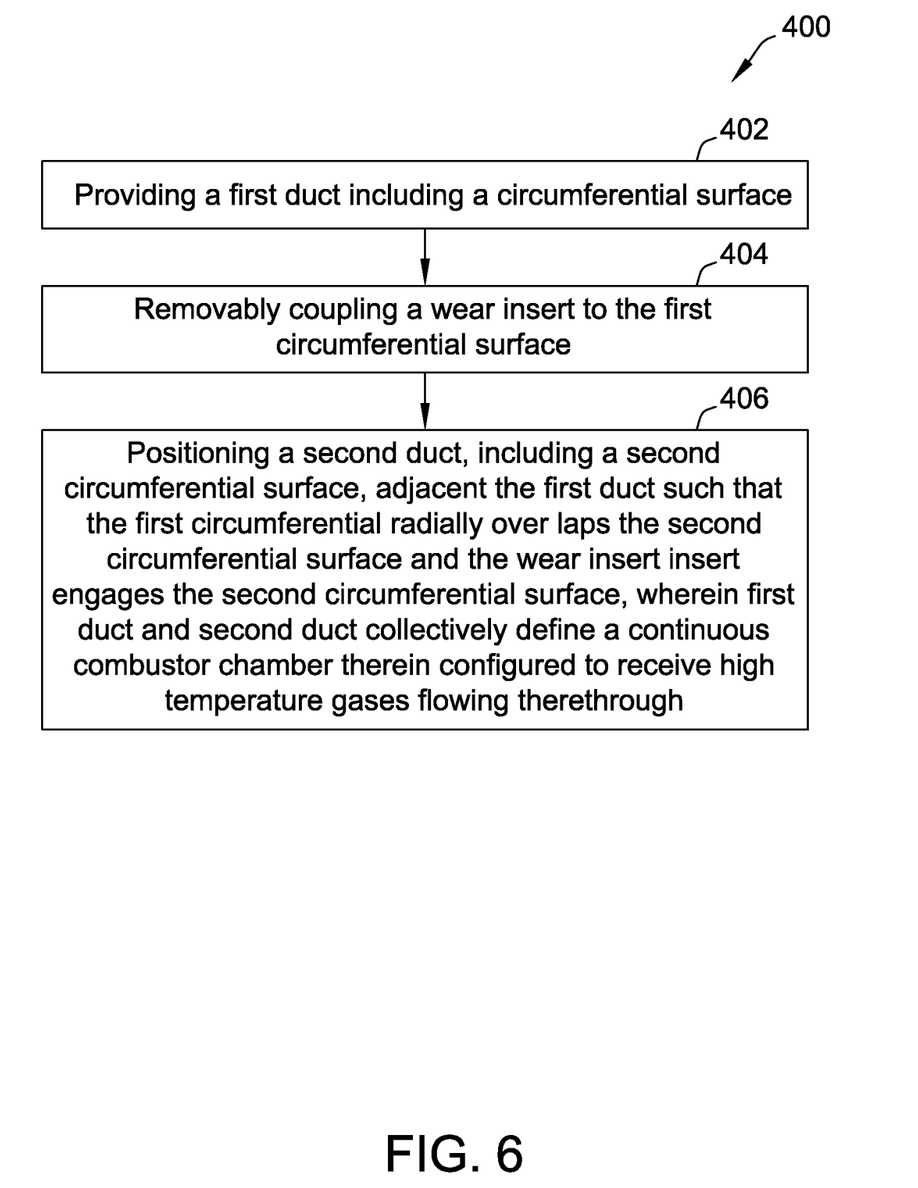
FIG. 6 is a flow diagram of an exemplary method of assembling a sleeve assembly, such as the sleeve assembly shown in FIG. 2.

FIG. 6 is a flow diagram of an exemplary method of method of assembling a sleeve assembly, such as sleeve assembly 120 (shown in FIG. 2). Method 400 includes providing 402 a first duct (e.g., transition duct 148, shown in FIG. 4) including a first circumferential surface (e.g., inner surface 168, shown in FIG. 4). Method further includes removably coupling 404 a wear insert surface (e.g., insert 166, shown in FIG. 4) to the first circumferential surface. Method also includes positioning 406 a second duct (e.g., liner 146, shown in FIG. 4), including a second circumferential surface (e.g., outer surface 163, shown in FIG. 4), adjacent the first duct such that the first circumferential surface radially over laps the second circumferential surface and the wear insert engages the second circumferential surface, where the first duct and second duct collectively define a continuous combustion chamber (e.g., combustion chamber 122, shown in FIG. 2) therein configured to receive high temperature gases (e.g., combustion gases 115, shown in FIG. 2) flowing therethrough.

The above described sleeve assemblies enable thermal expansion/movement between ducts of a combustor while allowing for such ducts to be more easily maintained. In particular, the above described sleeve assemblies include a wear insert that is removably coupled to at least one duct of the sleeve assembly to facilitate reducing abrasion resistance at a sliding interface within the sleeve assembly. The wear insert is removably coupled to a first circumferential surface of a first duct and extends radially to a second circumferential surface of a second duct. In some embodiments, the wear insert is removably coupled to the first duct via a plurality of weld joints. In other embodiments, the first duct defines a groove therein and the wear insert is seated in the groove. As a result, the sleeve assemblies inhibit wear at the surfaces of the first duct and the second duct during operation of the turbine assemblies. Rather, the wear insert absorbs the material wear resulting from sliding movement of one of the first duct and the second duct relative to the other.

Moreover, unlike some known sleeve assemblies, which may include a spray-on wear coating that must be removed and replaced over time, the wear inserts of the above described sleeve assemblies may be easily replaced by an operator when desired. For example, to remove the wear inserts of the above descried sleeve assemblies that include weld joints coupling the wear insert to the first duct, an operator need only sever the weld joints to remove the wear insert. Moreover, to remove the wear inserts of the above described sleeve assemblies that include a groove sized to receive the wear insert, an operator may manually remove the wear insert from the groove. Accordingly, the sleeve assemblies reduce the time and expense required to repair and maintain the sleeve assemblies.

An exemplary technical effect of the methods, systems, and apparatus described herein includes at least one of: (a) improved durability of sleeve assemblies; (b) reduced maintenance time required for repairing sleeve assemblies; (c) reduced material cost in assembling sleeve assemblies; and (d) improved longevity of sleeve assemblies.

Exemplary embodiments of a sleeve assembly for a turbine assembly and methods of assembling the sleeve assembly are described above in detail. The sleeve assembly is not limited to the specific embodiments described herein, but rather, elements of the sleeve assembly may be utilized independently and separately from other elements described herein. For example, elements of the sleeve assembly may also be used in combination with other turbine assemblies, and are not limited to practice with only the industrial gas turbine assembly as described herein. Rather, the exemplary embodiment may be implemented and utilized in connection with many other turbine assembly applications.

Although specific features of various embodiments may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of assembling a sleeve assembly for a combustion system of a turbine assembly, said sleeve assembly defining a central axis, said method comprising:
providing a first duct including a first circumferential surface, a first radial surface, and a second radial surface, the first and second radial surfaces extending radially inward from the first circumferential surface and defining a recessed groove axially therebetween;

removably coupling a wear insert to the first circumferential surface, the wear insert including a first radial edge and a second radial edge, wherein said coupling comprises positioning the wear insert within the recessed groove of the first duct such that the first radial edge engages the first radial surface and the second radial edge engages the second radial surface to inhibit axial movement of the wear insert within the recessed groove; and positioning a second duct, including a second circumferential surface, adjacent the first duct such that the first circumferential surface radially over laps the second circumferential surface and the wear insert extends radially from the recessed groove and engages the second circumferential surface, wherein first duct and second duct collectively define a continuous combustion chamber therein configured to receive high temperature gases flowing therethrough, wherein said wear insert comprises a rectangular cross section having an axial length, parallel to the central axis, and a radial width, wherein the axial length is greater than the radial width.

2. A sleeve assembly for a combustion system of a turbine assembly, said sleeve assembly defining a central axis and comprising:

a first duct comprising a first circumferential surface, a first radial surface, and a second radial surface, said first and second radial surfaces extending radially inward from said first circumferential surface and defining a recessed groove axially therebetween;

a second duct comprising a second circumferential surface, said first circumferential surface radially overlapping said second circumferential surface such that said first duct and said second duct collectively define a continuous combustion chamber therein, the continuous combustion chamber configured to receive high temperature gases flowing therethrough; and a wear insert removably coupled to said first circumferential surface and comprising a first radial edge and a second radial edge, said wear insert positioned within the recessed groove of said first duct, wherein said first radial edge engages said first radial surface and said second radial edge engages said second radial surface to inhibit axial movement of said wear insert within said recessed groove, said wear insert extending radially from the recessed groove to engage said second circumferential surface, wherein said wear insert comprises a rectangular cross section having an axial length, parallel to the central axis, and a radial width, wherein the axial length is greater than the radial width.

3. The sleeve assembly in accordance with claim 2, wherein said wear insert is a single-piece unitary structure and is removable from said first circumferential surface as a single-piece.

4. The sleeve assembly in accordance with claim 2, wherein said wear insert extends continuously circumferentially about a circumference of said first circumferential surface.

5. The sleeve assembly in accordance with claim 2, wherein said second duct further comprises a body and a seal extending axially from said body, wherein said seal comprises said second circumferential surface.

6. The sleeve assembly in accordance with claim 5, wherein said wear insert inhibits direct contact between said first circumferential surface and said second circumferential surface.

7. The sleeve assembly in accordance with claim 2, wherein said second circumferential surface is positioned, at least partially, radially within said first circumferential surface and said first circumferential surface circumscribes said second circumferential surface.

8. The sleeve assembly in accordance with claim 2, wherein said second duct slidingly contacts said wear insert and does not contact said first circumferential surface of said first duct.

9. A turbine assembly comprising:

a compressor section;

a turbine section coupled downstream of said compressor section; and a combustor comprising a plurality of cans coupled in flow communication between said compressor section and said turbine section, a first can of said plurality of cans comprising a sleeve assembly defining a central axis and comprising:

a first duct comprising a first circumferential surface, a first radial surface, and a second radial surface, said first and second radial surfaces extending radially inward from said first circumferential surface and defining a recessed groove axially therebetween;

a second duct comprising a second circumferential surface, said first circumferential surface radially overlapping said second circumferential surface such that first duct and said second duct collectively define a continuous combustion chamber therein, the continuous combustion chamber configured to receive high temperature gases flowing therethrough; and a wear insert removably coupled to said first circumferential surface and comprising a first radial edge and a second radial edge, said wear insert positioned within the recessed groove of said first duct, wherein said first radial edge engages said first radial surface and said second radial edge engages said second radial surface to inhibit axial movement of said wear insert within said recessed groove, said wear insert extending radially from the recessed groove to engage said second circumferential surface, wherein said wear insert comprises a rectangular cross section having an axial length, parallel to the central axis, and a radial width, wherein the axial length is greater than the radial width.

10. The turbine assembly in accordance with claim 9, wherein said first duct extends between said second duct and said turbine section.

11. The turbine assembly in accordance with claim 9, wherein said second duct extends between said first duct and said turbine section.

12. The turbine assembly in accordance with claim 9, wherein said wear insert is a single-piece unitary structure and is removable from said first circumferential surface as a single-piece.

13. The turbine assembly in accordance with claim 9, wherein said wear insert extends continuously circumferentially about an entire circumference of said first circumferential surface.

14. The turbine assembly in accordance with claim 9, wherein said second duct further comprises a body and a seal extending axially from said body, wherein said seal comprises said second circumferential surface.

15. The turbine assembly in accordance with claim 14, wherein said wear insert inhibits direct contact between said first circumferential surface and said second circumferential surface.

* * * * *